(12) United States Patent
Wagenknecht et al.

(10) Patent No.: US 8,069,809 B2
(45) Date of Patent: Dec. 6, 2011

(54) STABILIZING OPENINGS FOR CORRUGATED PLASTIC WATER CRAFT FLOOR

(76) Inventors: Samuel James Wagenknecht, Rockford, IL (US); Terry Lee Wagenknecht, Rockford, IL (US); Charles Maxwell Wagenknecht, Rockford, IL (US)

( * ) Notice: Subject to any disclaimer, the term of this patent is extended or adjusted under 35 U.S.C. 154(b) by 11 days.

(21) Appl. No.: 12/069,625

(22) Filed: Feb. 12, 2008

(65) Prior Publication Data

US 2008/0134953 A1    Jun. 12, 2008

Related U.S. Application Data

(63) Continuation-in-part of application No. 11/288,463, filed on Nov. 29, 2005, now abandoned.

(51) Int. Cl.
*B63B 5/24* (2006.01)
(52) U.S. Cl. .................................................. 114/357
(58) Field of Classification Search .......... 114/352–355, 114/357
See application file for complete search history.

(56) References Cited

U.S. PATENT DOCUMENTS

| | | | | |
|---|---|---|---|---|
| 3,771,180 | A | * | 11/1973 | Tanabe .......................... 114/354 |
| 6,615,762 | B1 | * | 9/2003 | Scott .............................. 114/353 |
| 7,530,322 | B2 | | 5/2009 | Angelini |

FOREIGN PATENT DOCUMENTS

JP    55001228 A  *  1/1980

OTHER PUBLICATIONS

U.S. Appl. No. 11/288,463, filed Nov. 5, 2005, Wagenknecht.
D.D. 611029, Jan. 12, 2007, Wagenknecht.
U.S. Appl. No. 60/901,995, filed Feb. 13, 2007, Wagenknecht.

* cited by examiner

*Primary Examiner* — Daniel Venne
(74) *Attorney, Agent, or Firm* — Daniel Swayze, Jr.

(57) ABSTRACT

A laterally stable foldable boat comprising a single sheet of corrugated plastic further comprising a first planar plastic substrate, a second planar plastic substrate, a plurality of elongate parallel ribs disposed between and joining the first and second plastic substrates, the plurality of elongate parallel ribs extend parallel along the entire length of the plastic substrates to form a plurality of open flute channels lengthwise through the substrates, a plurality of bend lines, a plurality of folding hinges located at each corner of the single sheet of corrugated plastic, and a stabilizing ballast, that further includes a first plurality of apertures centrally located in the hull area, wherein the first plurality of apertures are formed perpendicular to the sidewall bend lines and create at least one opening in the plurality of flute channels, wherein the first plurality of apertures allow water to enter or exit the plurality of flute channels running lengthwise through the foldable boat.

20 Claims, 10 Drawing Sheets

Fig. 1,a
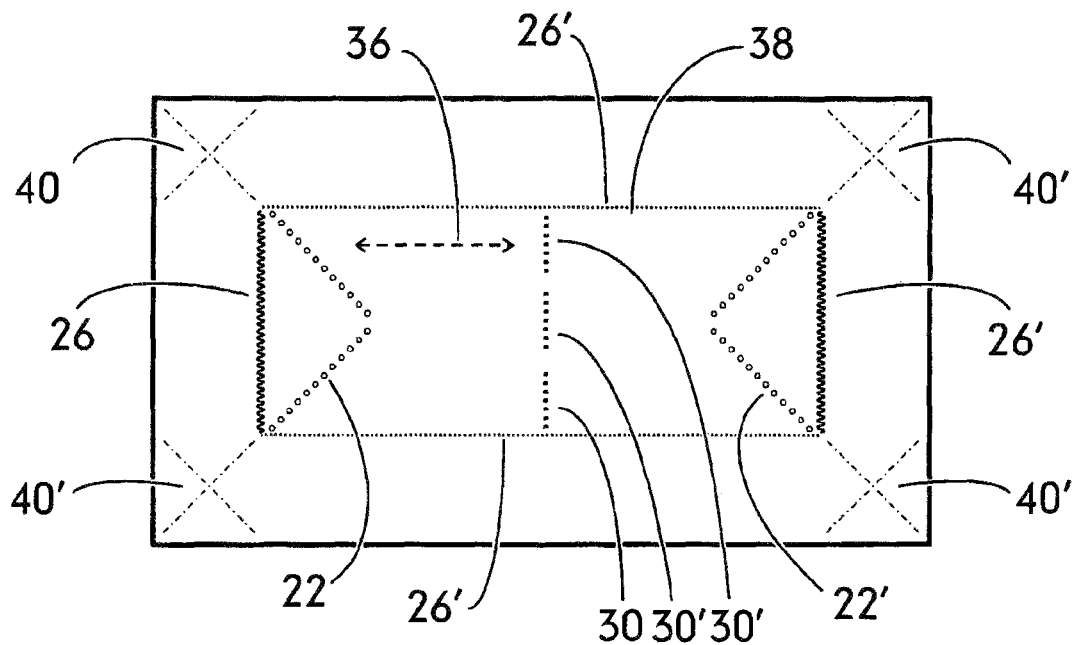
Fig. 1,b
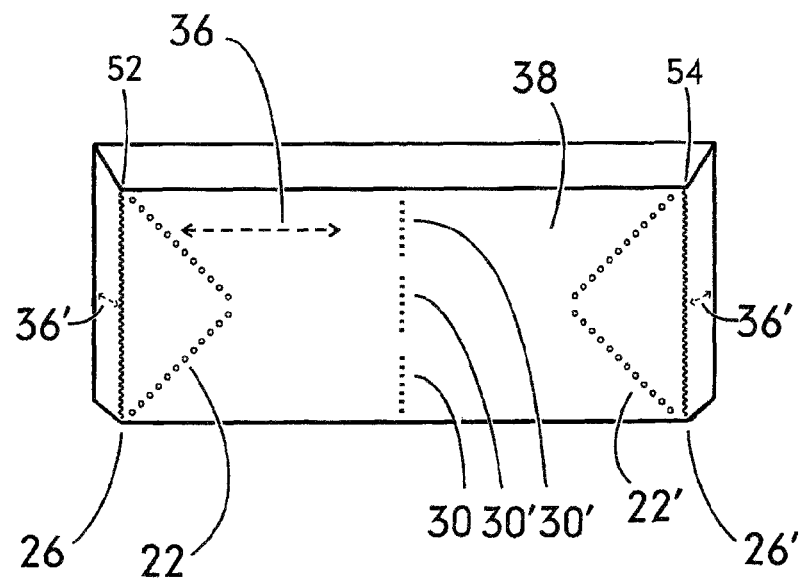

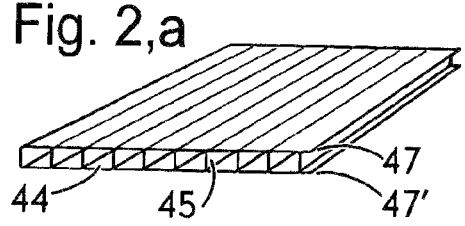
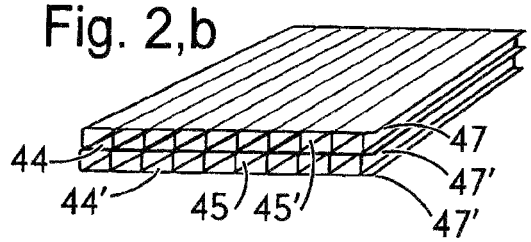
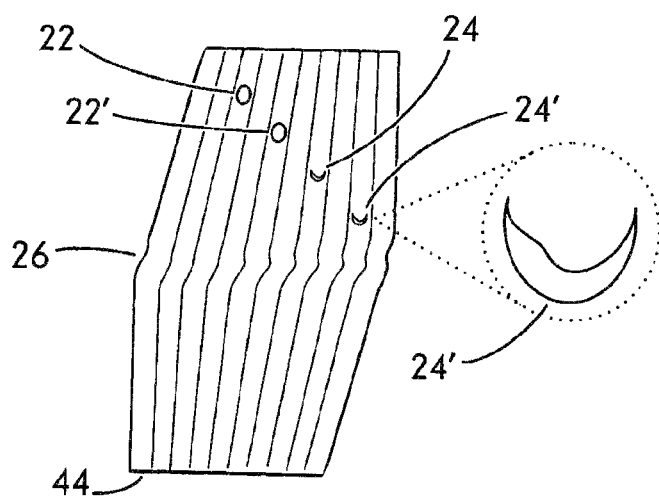
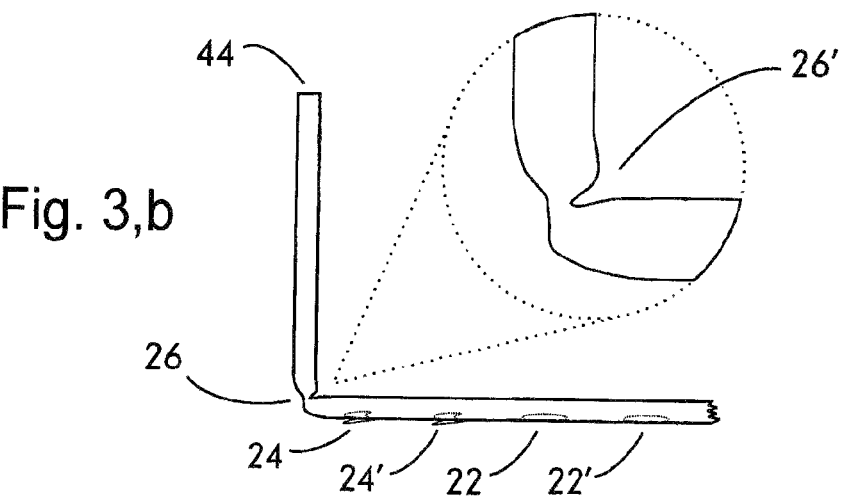

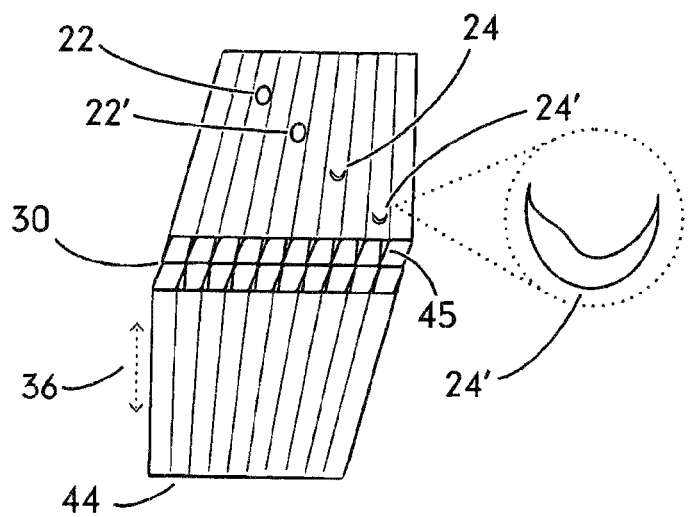
Fig. 4,a
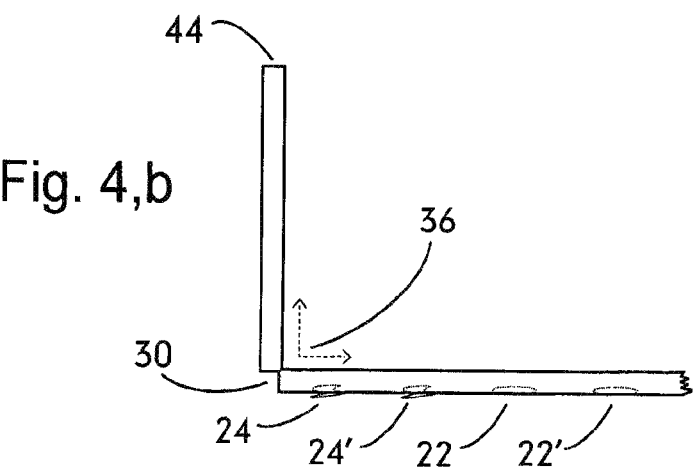
Fig. 4,b
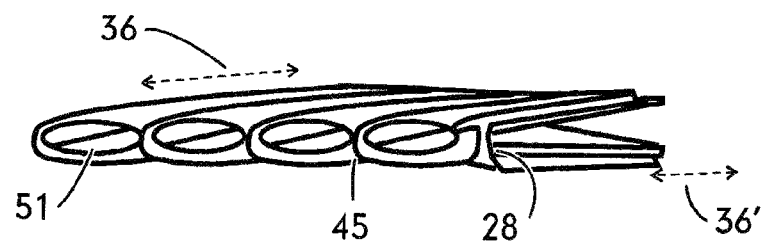
Fig. 4,c

Fig. 5,a
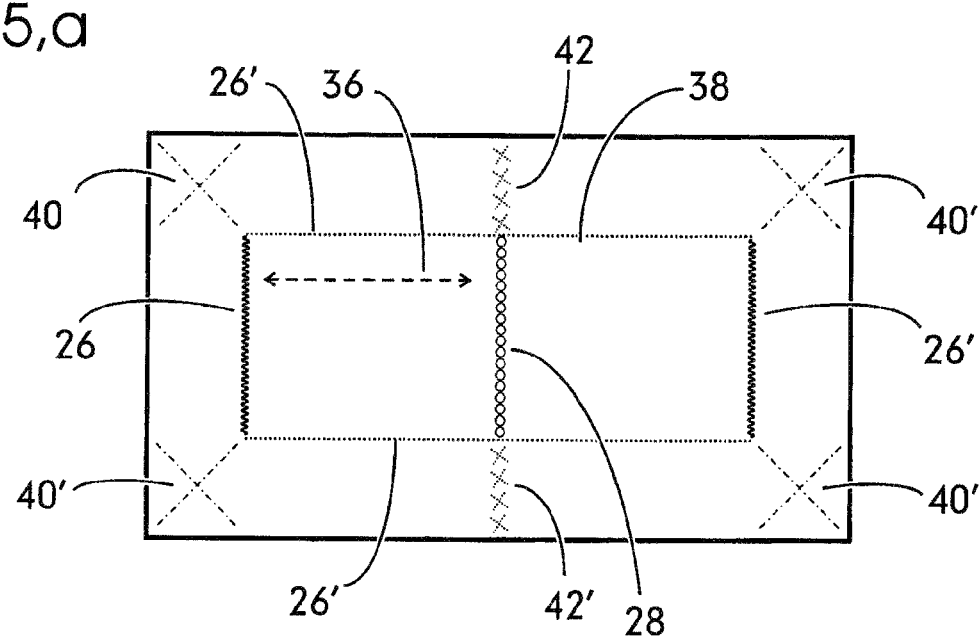
Fig. 5,b
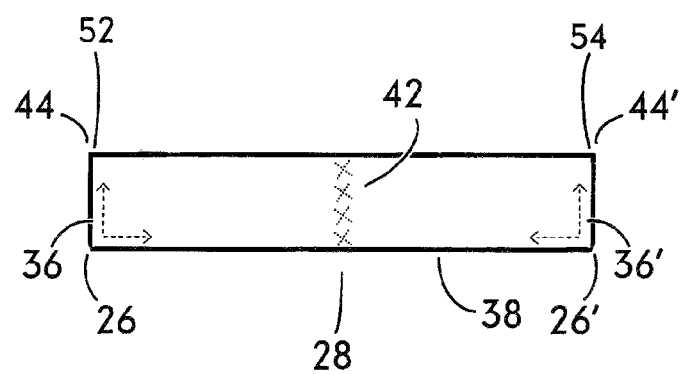
Fig. 5,c
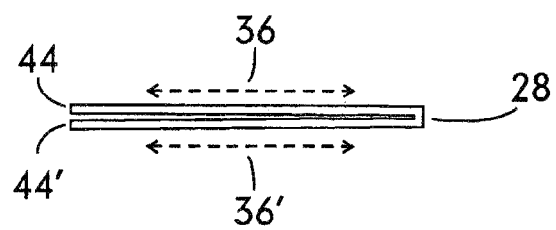

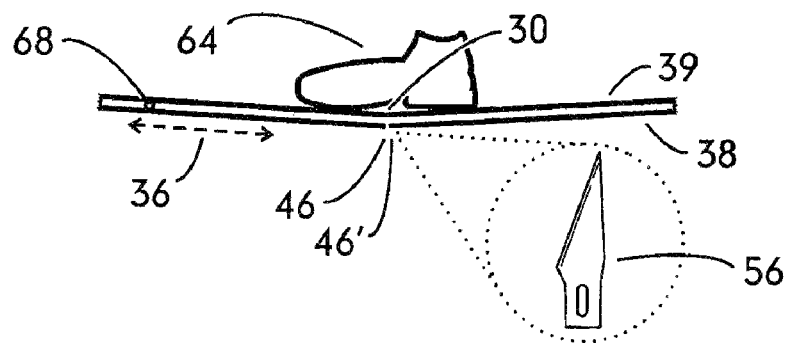
Fig. 6,a
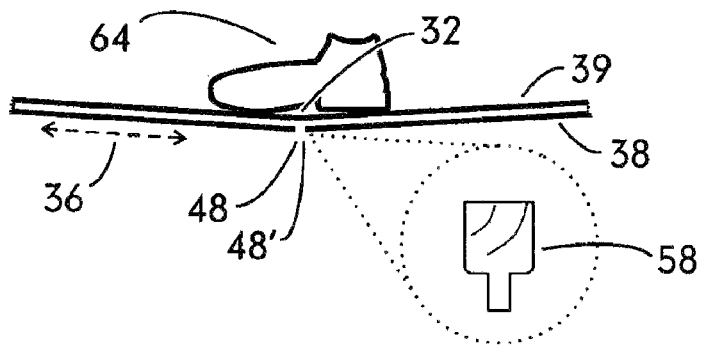
Fig. 6,b
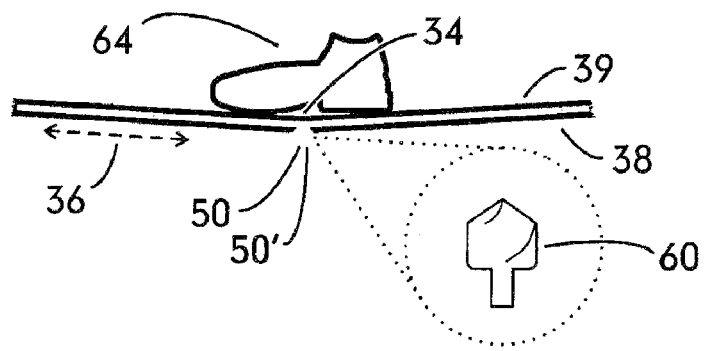
Fig. 6,c
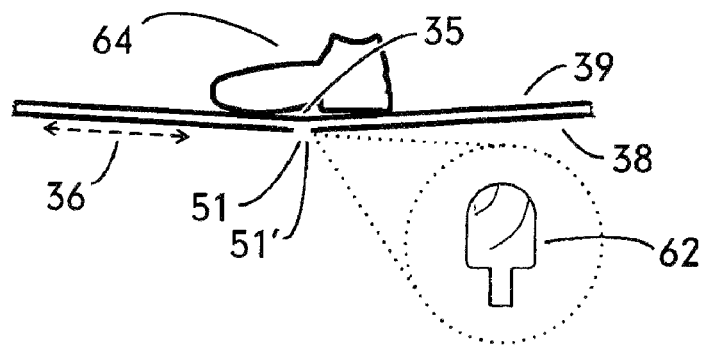
Fig. 6,d

Fig. 7,a
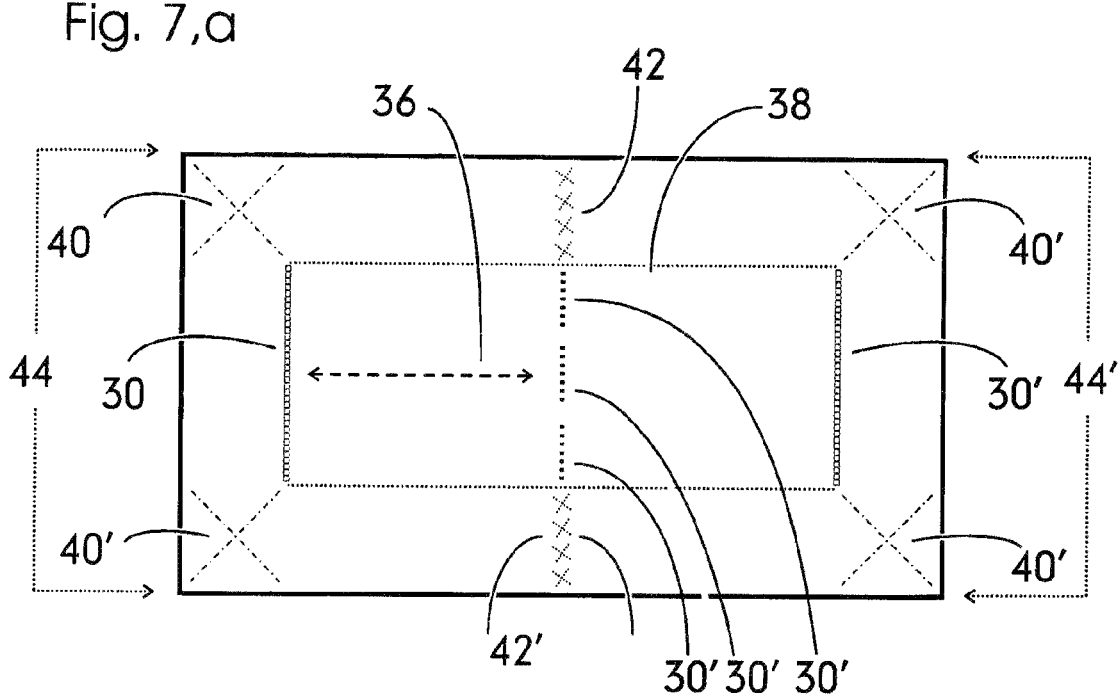
Fig. 7,b
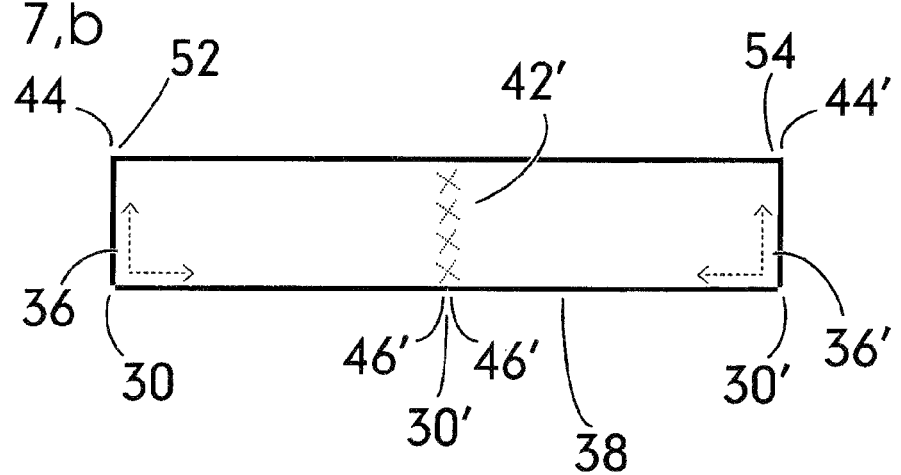
Fig. 7,c
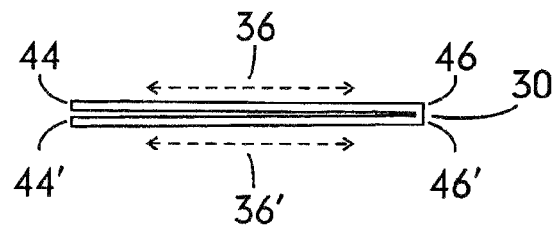

Fig. 8,a
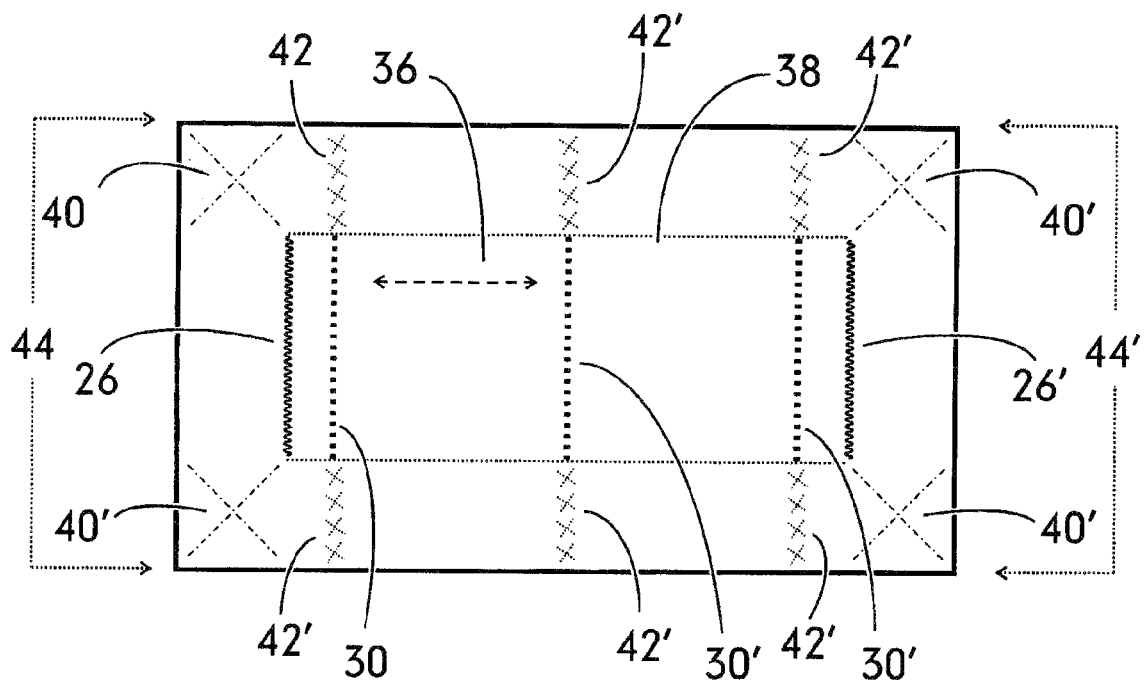
Fig. 8,b
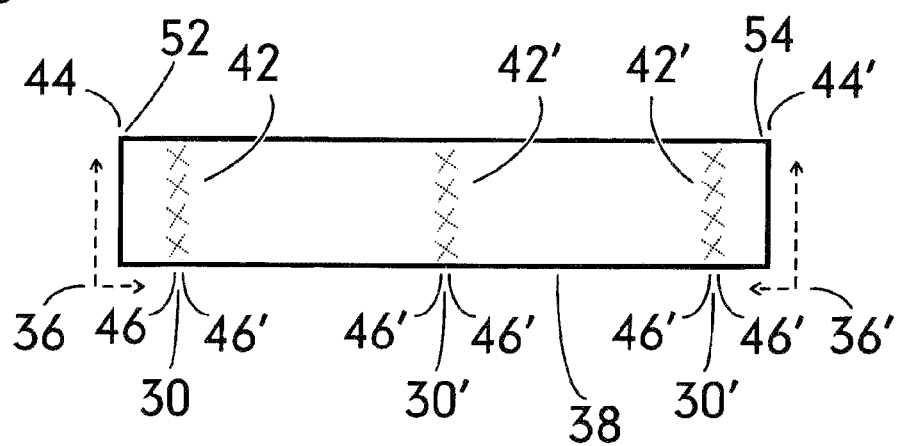

Fig. 8,c
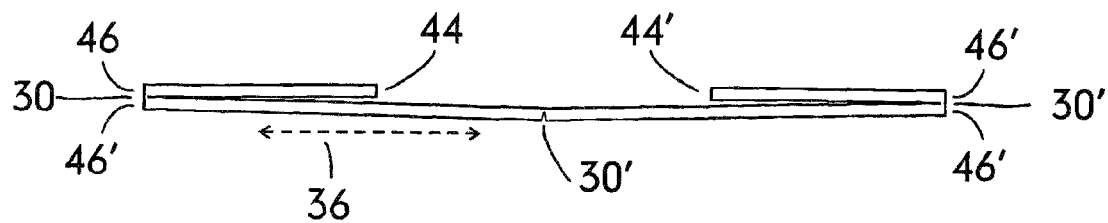
Fig. 8,d
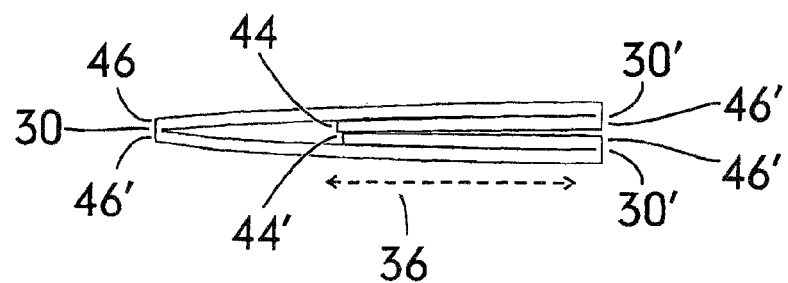
Fig. 8,e
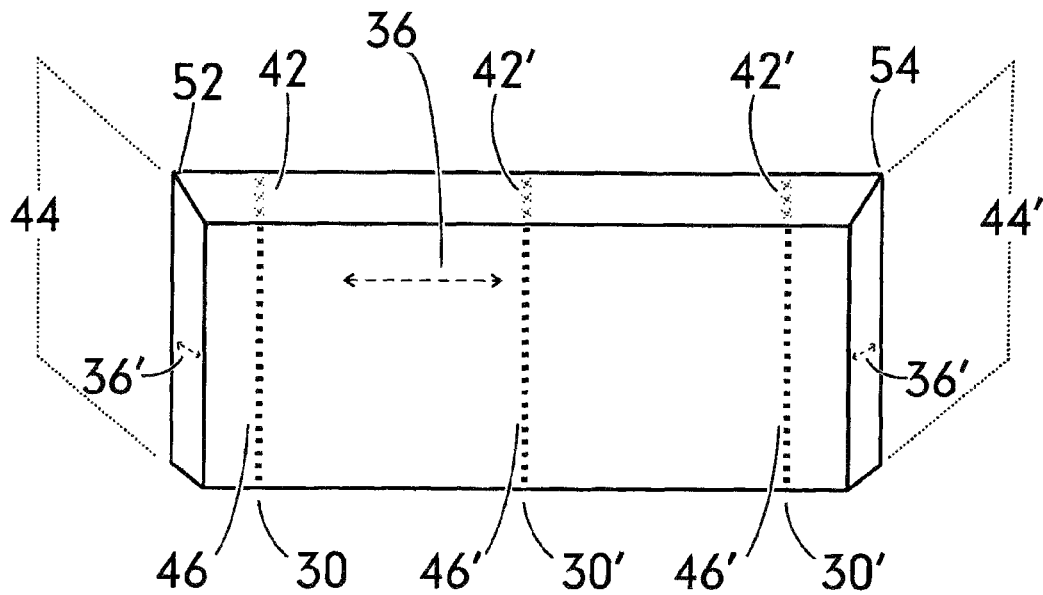

Fig. 9,a
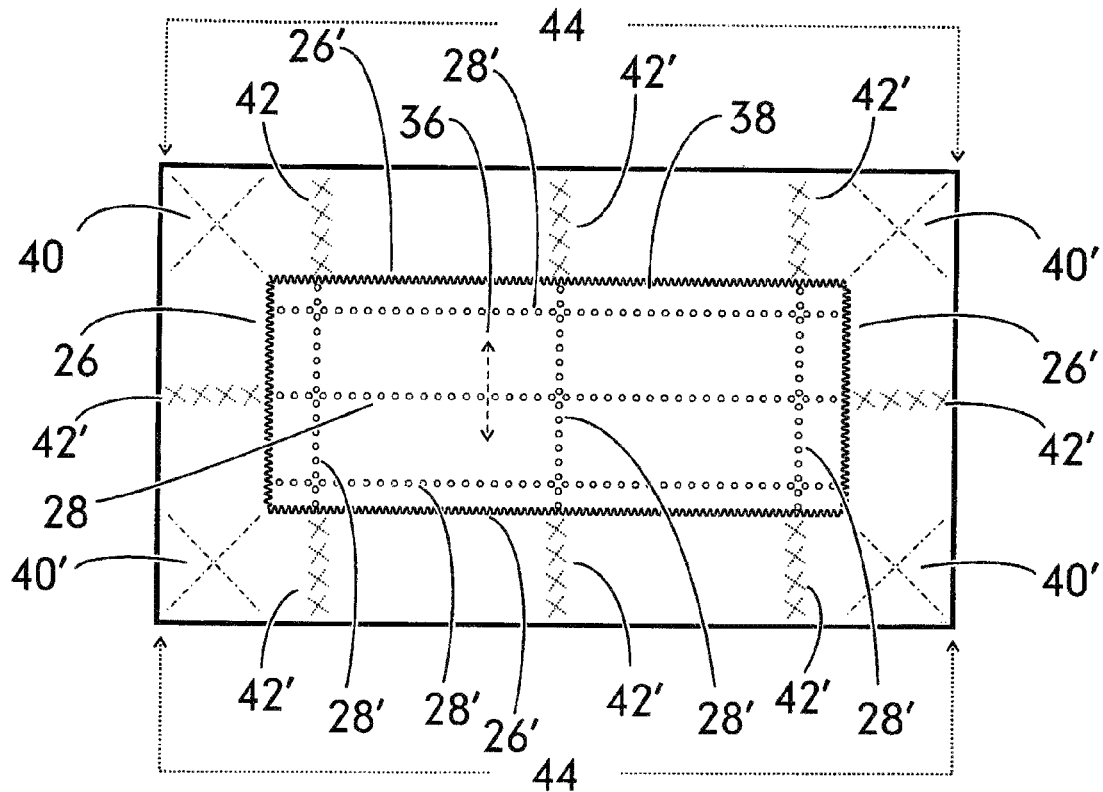
Fig. 9,b
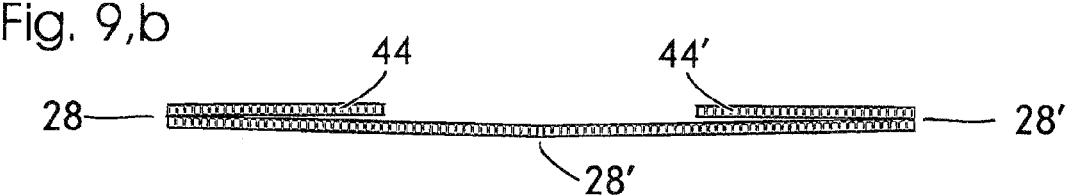
Fig. 9,c
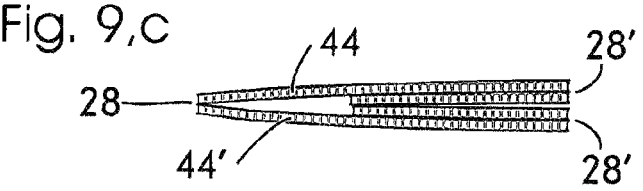

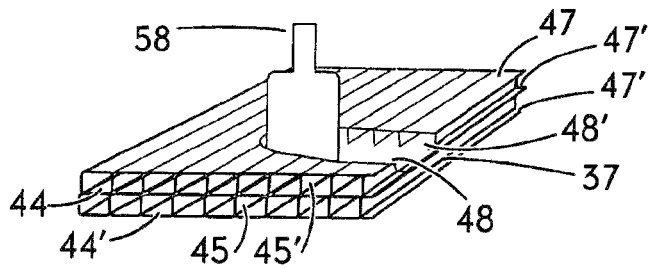
Fig. 10,a
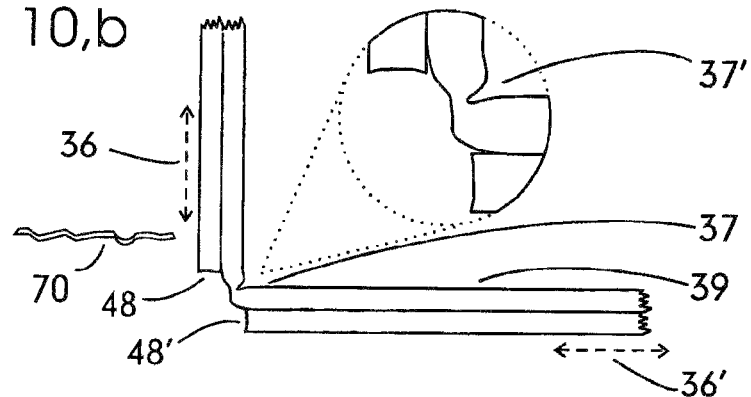
Fig. 10,b
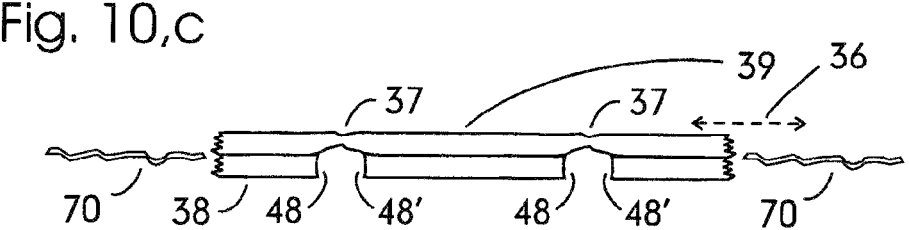
Fig. 10,c
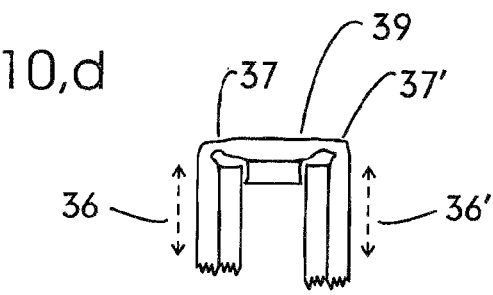
Fig. 10,d

STABILIZING OPENINGS FOR CORRUGATED PLASTIC WATER CRAFT FLOOR

CROSS-REFERENCE TO RELATED APPLICATIONS

This application is a continuation in part of application Ser. No. 11/288,463 filed Nov. 29, 2005 (now abandoned).

BACKGROUND OF THE INVENTION

This invention relates specifically to a laterally stable corrugated plastic water craft, and to those water crafts specifically formed from a single unitary sheet of corrugated plastic material comprising a plurality of planar walls conjoined by a plurality of elongate channel defining ribs, wherein the hull's exterior surface includes a plurality of openings located between the craft's bow end and aft end.

There are a number of light-weight foldable boats available. Many of the commercially available light-weight boats that have a number of disadvantages. One of the major disadvantages to these boats is the number of pieces required to assemble the light-weight boat. In addition to the number of pieces required to assemble the light-weight boat, many fasteners or adhesives are necessary to hold the boat in its final assembled position. When the boat is disassembled the adhesives or fasteners must be removed to unassembled the boat. Another disadvantage of the light-weight foldable boats are available, is that these boats do not offer generally provide lateral stability, and can actually give a user a sense of vertigo if the person tries to walk from the aft end of the bow end.

In a water craft made from 10 mil corrugated plastic, where; the 10 mil describes the channels' wall thickness; there are approximately 64 individual flute channels located in a 27" wide water craft's floor. Each individual flute channel's dimension is approximately 0.35 inch by 0.42 inch. Within an enclosed flute channel, a body of air between two bodies of fluid will take more time to assimilate and then flow, as when compared to only one body of fluid. This condition may be defined here as a randomly moving air pocket which creates slight turbulence within the water's flow by just the very presence of the body of air between the two bodies of fluid. When the flow of these bodies of fluid, and air, and then fluid are only moved by gravity, and a passenger's weight load upon the floor's fluid displacement mass, and the environment's surrounding fluid air pressure, the flow's speed is additionally affected by the enclosed channel's elongate dimensional length. In a water craft made from corrugated plastic turbulence of a randomly moving air pockets may be taking place in up to 64 different enclosed channels at the same time, and so gives even more importance to a quicker purging of any air pockets within the channels; and where timing is everything to retain a more consistent uniform lateral stability.

In a water craft formed from corrugated plastic, the craft's weight is around ten to fourteen pounds, or next to nothing as when compared to most water crafts. As a passenger steps toward the bow, the bow quickly sinks beneath the waterline, and so traps air within the flute channels to form one or more air pockets, or possibly 64 total air pockets as previously described. The air pockets then randomly flow back and forth between the craft's bow and stern. As the passenger steps back toward the stern, the multiple and randomly flowing air pockets may be just beneath their next foot step.

Any constant change between good lateral stability and less lateral stability can quickly create a beginning point of confusion of balance for the passenger; and where any over-correction or mistaken move to correct their balance may tend to escalate until all balance is lost. In aeronautical terms, it may be comparatively described as vertigo; or a situation where a pilot loses all their conscious senses of their known coordinates or bearings of balance and or location.

Timing is everything as a standing passenger waits for all air pockets to escape, and for the flute channels to re-fill before regaining the previous degree of lateral standing stability. Gravity propelled fluid takes time to travel. Gravity propelled fluids with turbulence creating air pockets between take even more time to travel. Both fluids with air between, or fluids without air between will take longer to purge any air pockets when the channels extend the entire length of a water craft's floor.

Therefore, there is an ongoing need for light weight, one piece, foldable boat having uniform lateral stability.

SUMMARY OF THE INVENTION

The following provides a summary of certain exemplary embodiments of the present Invention. This summary is not an extensive overview and is not intended to identify key or critical aspects or elements of the present invention or to delineate its scope.

One aspect of the present invention includes a foldable boat comprising a single sheet of corrugated d plastic, a plurality of bend lines formed on the single sheet of corrugated plastic, a plurality of folding hinges located at each corner of the sheet of corrugated plastic wherein the plurality of folding hinges cooperate with the plurality of sidewall bend lines, aft bend line, and bow bend line to enable the first plastic substrate and second substrate to fold inward to form an open cabin; and a stabilizing ballast. The single sheet of corrugated plastic further includes a first plastic substrate, wherein the first plastic substrate forms a floor area and interior sidewalls of the foldable boat, a second plastic substrate overlying the first plastic substrate, wherein the second plastic substrate forms a hull area and exterior sidewalls of the foldable boat; and a plurality of elongate parallel ribs disposed between and joining the first elastic substrate and the second elastic substrate, wherein the plurality of elongate parallel ribs extend parallel along the entire length of the first and second plastic substrates to form a plurality of flute channels lengthwise through the conjoined first plastic substrate and the second plastic substrate. The plurality of bend lines further include a plurality of sidewall bend lines, wherein the plurality of sidewall bend lines are formed along a portion of the length of the sheet of corrugated plastic, wherein the sidewall bend lines allow a lengthwise portion of the corrugated d plastic sheet to hingeably move to form a plurality of sidewalls of the foldable boat, an aft bend line, disposed between the plurality of sidewall bend lines, wherein the aft bend line is formed along a portion of the width of the sheet of corrugated plastic at an aft end, wherein the aft bend line allows a first end portion of the sheet of corrugated plastic to hinny move to form an aft end sidewall of the foldable boat, and a bow bend line, disposed between the plurality of sidewall bend lines and opposite the aft bend line, wherein the bow bend line is formed along a portion of the width of the sheet of corrugated plastic at a bow end, wherein the bow bend line allows a second end portion of the sheet of Corrugated plastic to hingeably move to form a bow end sidewall of the foldable boat. The stabilizing ballast further includes a first plurality of apertures centrally located in the hull area, wherein the first plurality of apertures are formed perpendicular to the sidewall bend lines and create at least one opening in the plurality of flute channels, wherein the first plurality of apertures allow water to enter or exit the plurality of flute channels running lengthwise through the foldable boat.

Another aspect of the present invention includes a foldable boat comprising a single sheet of corrugated plastic, a plurality of bend lines formed on the sheet of corrugated plastic a plurality of folding hinges located at each corner of the sheet of corrugated plastic, wherein the plurality of folding hinges cooperate with the plurality of sidewall bend lines, aft bend line, and bow bend line to enable the first plastic substrate and second substrate to fold inward to form an open cabin, and a stabilizing ballast. The single sheet of corrugated plastic further includes a first plastic substrate, wherein the first plastic substrate forms a floor area and interior sidewalls of the foldable boat, a second plastic substrate overlying the first plastic substrate, wherein the second plastic substrate forms a hull area and exterior sidewalls of the foldable boat, and a plurality of parallel ribs disposed between and joining the first plastic substrate and the second plastic substrate, wherein the plurality of parallel ribs extend perpendicular along the length of the first and second plastic substrates to form a plurality of flute channels widthwise through conjoined first plastic substrate and the second plastic substrate. The plurality of bend lines formed on the sheet of corrugated plastic further include a plurality of sidewall bend lines, wherein the plurality of sidewall bend lines are formed along a portion of the length of the sheet of corrugated plastic, wherein the sidewall bend lines allow a lengthwise portion of the sheet of corrugated plastic to hingeably move to form a plurality of sidewalls of the foldable boat, an aft bend line, disposed between the plurality of sidewall bend lines, wherein the aft bend line is formed along a portion of the width of the sheet of corrugated plastic at an aft end, wherein the aft bend line allows a first end portion of the corrugated plastic to hingeably move to form an aft end sidewall of the foldable boat; and a bow bend line, disposed between the plurality of sidewall bend lines and opposite the aft bend line, wherein the bow bend line is formed along a portion of the width of the sheet of corrugated plastic at a bow end, wherein the bow bend line allows a second end portion of the corrugated plastic to hingeably move to form a bow end sidewall of the foldable boat. The stabilizing ballast further includes a first lengthwise plurality of apertures formed in a line of the hull area and centrally located lengthwise in the hull area, wherein the first plurality of lengthwise apertures are formed parallel to the sidewall bend lines and perpendicular to the aft bend line and bow bend line and create at least one opening in the plurality of flute channels, wherein the first lengthwise plurality of apertures allow water to enter or exit the plurality of flute channels running widthwise through the foldable boat.

Another object of the present invention is to provide a foldable boat comprising a single sheet of corrugated plastic, a plurality of bend lines formed on the corrugated plastic sheet, a plurality of folding hinges located at each corner of the single sheet of corrugated plastic, and a stabilizing ballast. The single sheet of corrugated plastic further includes a first plastic substrate, wherein the first plastic substrate forms a floor area and interior sidewalls of the foldable boat, a second plastic substrate overlying the first plastic substrate, wherein the second plastic substrate forms a hull area and exterior sidewalls of the foldable boat, a plurality of elongated parallel ribs disposed between and joining the first plastic substrate and the second plastic substrate, wherein the plurality of elongated parallel ribs extend parallel along the entire length of the first and second plastic substrates to form a plurality of flute channels lengthwise through the conjoined first plastic substrate and the second plastic substrate. The plurality of bend lines further include a plurality of sidewall bend lines, wherein the plurality of sidewall bend lines are formed along a portion of the length of the hull area, wherein the sidewall bend lines allow a lengthwise portion of the sheet of corrugated plastic to hingeably move to form a plurality of sidewalls of the foldable boat; an aft opening line formed from a plurality of openings in the hull area at an aft end, wherein the aft opening line is disposed between the plurality of sidewall bend lines and allows a first end portion of the sheet of corrugated plastic to hingeably move to form an aft end sidewall of the foldable boat, and wherein the plurality of openings in the aft opening line allow water to enter and exit the plurality of flute channels, and a bow opening line formed from a plurality of openings in the hull area at a bow end, wherein the bow opening line is disposed between the plurality of sidewall bend lines and allows a second end portion of the corrugated plastic to hinny move to form a bow end sidewall of the foldable boat, and wherein the plurality of openings in the bow opening line allow water to enter and exit the plurality of flute channels. The plurality of folding hinges cooperate with the plurality of sidewall bend lines, aft opening line, and bow opening line to enable the first plastic substrate and second substrate to fold inward to form an open cabin. The stabilizing ballast further includes a plurality of a apertures centrally located in the hull area, wherein the plurality of apertures are formed perpendicular to the sidewall bend lines and create at least one additional openings in the plurality of flute channels, wherein the plurality of apertures allow water to enter or exit the plurality of flute channels running lengthwise through the foldable boat.

An advantage of the present invention is to permit a manufacturer or user the choice to continue any bend lines to the perimeter of the corrugated plastic sheet to provide the ability to more compactingly fold the corrugated plastic sheet water craft in the elongate length direction.

One advantage of spaced and aligned aperture arrangements retains the combination of the floor and hull in a rigid planar form until the user completes any aperture formed weakened hinge lines by hand; and which also may include the manufacturer's extended weakened hinge lines which extend the vertical height of any sidewalls.

In at least one alternative embodiment, and when a manufacturer chooses a corrugated plastic substrate with its elongate flute direction being perpendicular to the floor's elongate length, flute channel openings may be formed at and adjacent the floor's perimeter edges; and with additional inwardly located apertures for a more controlled flow of a water's inlet and exiting. Sizing and quantity of the apertures are negotiable according to a manufacturer's planned weight load limit of the corrugated plastic floor and the complete water craft.

An alternative embodiment may include resulting weakened hinge bend lines due to aligned aperture, or slit, or slot formed openings which align in a straight path, and with groups of aligned apertures perpendicularly intersecting another for a resulting advantage of folding a floor in either one of two different directions.

One advantage of using a triple wall or more corrugated substrate is in the forming of any openings or apertures within one planar membrane wall, or its conjoining ribs; and where any remaining planar membrane walls provide a multiple wall leak proof surface for a more substantial and rigid floor.

Yet another advantage of the present invention is a more laterally stable foldable boat made from corrugated plastic, wherein the corrugated plastic allows the hull and floor to be formed from the same sheet of material, thereby eliminating additional pieces for the foldable boat's construction, thus providing a more laterally stable corrugated plastic water craft. The plurality of apertures formed in the hull area of the single sheet of corrugated plastic provide a fluid weight counter-balancing and stabilizing effect when the flute channels are filled with water by decreasing the length of each of the plurality of flute channels. The plurality of flute channel aperture openings located inwardly centrally between the bow and aft ends allow for a quicker purging of any randomly moving de-stabilizing air pockets. In some alternative embodiments, when the aligned apertures or openings are located at the bow end, a bow hinge line, and located at the aft end, and aft hinge line, which, provides an optional advantage of a further and more compactable folding of the unassembled corrugated plastic water craft. Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein:

FIG. 1a is a plan bottom view of an unassembled foldable corrugated plastic boat of the present invention.

FIG. 1b is a perspective bottom view of an assembled foldable corrugated plastic boat highlighting the exterior hull surface.

FIG. 2a is a perspective view of a commonly available double wall corrugated plastic substrate with exposed and factory cut-off flute channel openings.

FIG. 2b is a perspective view of an uncommonly available triple wall corrugated plastic substrate with exposed and factory cut-off flute channel openings.

FIG. 3a is a perspective bottom view and including a partial zoom view of a corrugated plastic substrate with a crimped bend line.

FIG. 3b is a side and upright view of FIG. 3a, and includes a partial zoom view of a corrugated plastic substrate with a crimped bend line.

FIG. 4a is a perspective bottom view of the hull and sidewall, and includes a partial zoom view of inwardly located circular apertures and inwardly located fish scale like semi-circular tabular flaps.

FIG. 4b is a side and upright view of the corrugated plastic substrate of FIG. 4a.

FIG. 4c is a an end and slightly perspective view of a bend line formed from a plurality of circular apertures within a corrugated plastic substrate.

FIG. 5a is a plan bottom view of an alternative embodiment of an unassembled foldable corrugated plastic boat of the present invention.

FIG. 5b is a side view of FIG. 5a.

FIG. 5c is a side view of FIG. 5a unassembled water craft in a compacted and folded position.

FIG. 6,a; A side and partial view of a water craft's floor, and showing a slit formed weakened hinge line, and a human user's weight load represented by a shoe, and a zoom view of the tool which formed the slit.

FIG. 6b is a side and partial view of a water craft's floor, and showing a slot formed aperture, and a human user's weight load represented by a shoe, and a zoom view of the tool which formed the slot.

FIG. 6c is a side and partial view of a water craft's floor, and showing a V-shape notch formed aperture, and a human user's weight load represented by a shoe, and a zoom view of the tool which formed the V-shape notch.

FIG. 6d is a side and partial view of a water craft's floor, and showing a concave semi-spherical shape notch formed aperture, and a human user's weight load represented by a shoe, and a zoom view of the tool which formed the concave semi-spherical shape notch.

FIG. 7a plan bottom view of another alternative embodiment of an unassembled foldable corrugated plastic boat of the present invention.

FIG. 7b is a side view of FIG. 7a.

FIG. 7c is a side view of FIG. 7a aft in a folded position.

FIG. 8a is a plan bottom view of another alternative embodiment of an unassembled foldable corrugated plastic boat of the present invention.

FIG. 8b is a side view of FIG. 8a.

FIG. 8c is a side view of FIG. 8a with the water craft's outer portions or sidewalls folded inwardly.

FIG. 8d is a side view of FIG. 8a in a completely folded position.

FIG. 8e is a perspective bottom view of FIG. 8a in an assembled foldable corrugated plastic boat highlighting the exterior hull surface.

FIG. 9a is a plan bottom view of another alternative embodiment of an unassembled foldable corrugated plastic boat of the present invention.

FIG. 9b is a side view of FIG. 9a being partially folded.

FIG. 9c is a side view of FIG. 9a being completely folded.

FIG. 10a is a perspective view of a triple wall corrugated substrate being cut with a wide slot forming tool.

FIG. 10b is a side view of the triple wall substrate of FIG. 10a; and after the triple wall substrate is bent approximately 90 degrees toward the floor's surface.

FIG. 10c is a side and upright view of the floor of a triple wall substrate when two groups of slot formed apertures are submerged beneath a water craft's draft line.

FIG. 10d is a side view of the substrate of FIG. 10c when the triple walled substrate is completely folded.

DETAILED DESCRIPTION OF THE INVENTION

FIGS. 1a; 5a; and 8a show a bottom plan view of an unassembled foldable boat 10. Unassembled foldable boat (10) includes an approximately planar single sheet of double wall corrugated plastic (11) comprising further including a first plastic substrate (12), having a widthwise dimension and a lengthwise dimension and a second plastic substrate (15), having a widthwise dimension and lengthwise dimension, overlying first plastic substrate (12). First plastic substrate (12) forms a floor area (13) and interior sidewalls (14) of foldable boat (10) (see FIG. 3b). Second plastic substrate (15) forms a hull area (16) and exterior side walls (17) of foldable boat (10). First plastic substrate (12) and second plastic substrate (15) are joined together by a plurality of elongate parallel ribs (45) extending parallel along the entire lengthwise direction of the first and second substrates (12, 15). Single sheet of corrugated plastic (11), here shown as a double walled sheet of corrugated plastic allows for the floor area (13) and hull area (16) of the foldable boat (10) to be formed from the same sheet of material. Plurality of elongate parallel ribs (45) form a plurality of flute channels (44) that run lengthwise through and join first plastic substrate (12) and second plastic substrate (15). In this embodiment hull area (16) is equally distanced inward from the corrugated plastic substrate's outer perimeter edges, and is equally proportionate to the corrugated plastic substrate's perimeter edges. Plurality of bend lines (23), (26), and (27) formed on single sheet of corrugated plastic (11) define the perimeter of hull area (16) and floor area (13). Plurality of bend lines include a plurality of sidewall bend lines (26), an aft bend line (23) and a bow bend line (27). Plurality of sidewall bend lines (26) are formed along a portion of the length (labeled "L") of the single sheet of corrugated plastic (11). Sidewall bend lines (26) allow a lengthwise portion of corrugated plastic sheet (11) to hingeably move to form a plurality of sidewalls (14), (17) of foldable boat (10). Aft bend line (23) is disposed between and perpendicular to plurality of sidewall bend lines (26) and is formed a long a portion of the width (labeled "W") of the sheet of corrugated plastic (11) at the aft or stem end (54) of foldable boat (10). Aft bend line (23) allows first end portion (19) of sheet of corrugated plastic (11) to hingeably move to form an aft end sidewall of foldable boat (10). Bow bend line (27) is disposed between and perpendicular to plurality of sidewall bend lines (26) and is formed a long a portion of the width (labeled "W") of the sheet of corrugated plastic (11) at the bow end (52) of foldable boat (10). Bow bend line (27) allows second end portion (20) of sheet of corrugated plastic (11) to hingeably move to form a bow end sidewall of foldable boat (10). In the present embodiment, crimps made in the corrugated plastic form the plurality of bend lines, as a result there are no open flute channels at the bow end (52) or aft end (54) of foldable boat (10). Plurality of folding hinges (40), shown as an "X" shape on each of the corners of sheet of corrugated plastic (11). Plurality of folding hinges (40) cooperate with plurality of sidewall bend lines (26), aft bend line (23), and bow bend line (27) to enable sheet of corrugated plastic (11) to fold inward to form an open cabin (41) (see FIG. 3b) and floor area (13) of foldable boat (10). A water craft manufacturer can vary the location of folding hinges (40) in corners to form a slightly different sized open cabin (41) of foldable boat (10). Foldable boat 10 additionally includes a stabilizing ballast (80). Stabilizing ballast (80) further includes a first plurality of apertures (30) centrally located in hull area (16). First plurality of apertures (30) are formed perpendicular to sidewall bend lines (26) and create at least one opening in the plurality of flute channels (44). First plurality of apertures (30) allow water to enter or exit plurality of flute channels (44) running lengthwise through foldable boat (10). As shown in FIG. 1a, within hull area (16) are four groups of circular shape apertures (22) cut through the second plastic substrate planar surface. The second plurality of apertures (32) form a "V" shape running diagonally from the junction of the sidewall bend lines (26) and bow line (27). Third plurality of apertures (53) form a "V" shape running diagonally from the junction of the sidewall bend lines (26) and aft bend line (23). Each set of circular shaped apertures (22) is individually aligned to extend inwardly from each of the four corner areas and angularly toward the center of hull area (16). As shown in FIG. 1a, first plurality of apertures (30) of stabilizing ballast (80) include, three groups of aligned and intermittently continuous flute channel openings which have a secondary function of forming a potential weakened hinge bend line(s) (42) to allow foldable boat (10) to be compactly folded when unassembled. In this embodiment, first plurality of apertures (30) are formed as a slit located intermediate the hull's length, and extending the hull's width. The double ended dashed arrow (36) discloses the direction of the elongate flute channel (44) in foldable boat (10). flutes' direction (36). Adjacent and surrounding the hull's (38) perimeter, are a water craft manufacturer's crimped weakened hinge lines (26) which also form the hull's perimeter edges. Located outwardly from the hull's perimeter are X-shapes (40) in each of the substrate's corners which represent a water craft manufacturer's choice in their method of formation of an open cabin water craft. FIG. 1,b is a bottom perspective view of FIG. 1,a, and is showing the same described elements with the addition of a water craft's bow (52) location and its stern or aft (54) location; as the substrate is now viewed as an assembled water craft and its combination floor and hull (38).

FIG. 1b is a perspective bottom view of FIG. 1a, shown in a assembled position. Also shown are bend line (26) locations which establish the hull are (16) perimeter, floor area (13) and direction (36) of elongated flute channels (44) in assembled foldable boat (10), and a plurality of circular shape apertures (22) in a V-shape.

FIG. 2a is a perspective view of a commonly available double wall corrugated plastic substrate with exposed and factory cut-off flute channel openings (44), and paralleling ribs (45) which join the first plastic substrate (12) and second plastic substrate (15) to form a plurality of flute channels (44) throughout the single sheet of corrugated plastic (11).

FIG. 2b is a perspective view of an uncommonly available triple wall corrugated plastic substrate with exposed and factory cut-off flute channel openings (44), and paralleling ribs (45) which join the and are disposed between first plastic substrate (12), intermediate plastic substrate (18), and second plastic substrate (15) to form a plurality of flute channels (44) throughout the single sheet of triple wall corrugated plastic (11).

FIG. 3a is a perspective bottom view of foldable boat (10). Sidewall bend line (26) is aligned perpendicular to direction (36) of flute channel (44). Also shown are a plurality of inwardly located circular apertures (22) and inwardly located fish scale like semi-circular tabular flap openings (24) in hull area (16).

FIG. 3b is a side and upright view of FIG. 3,a, and including a partial zoom view of a corrugated plastic sidewall bend line (26), showing the crimped area (29) created by sidewall bend line (26).

FIG. 5a is a plan bottom view of an alternative embodiment of the unassembled foldable boat (10) of the present invention, wherein the stabilizing ballast (80) includes a first plurality of apertures (30). As shown in FIGS. 5a, and 5c, stabilizing ballast (80) and first plurality of apertures (30) also serve as a potential weakened hinge line (28), wherein the weakened hinge line allows the user to compactly fold the unassembled foldable boat (10).

FIG. 5b is a side view of FIG. 5a, of an exterior side wall (17) of an assembled foldable boat (10). As shown in FIGS. 5a and 5b when the foldable coat (10) is assembled the direction (36) of the flute channels (44) are both parallel to exterior side walls (17) and perpendicular to exterior side walls (17). In another embodiment, another plurality of weakened hinge bend lines (42) are included and designated by the dotted "X" shapes. Plurality of weakened hinge bend lines (42) allow user to compactly fold unassembled foldable boat (10) in the lengthwise direction, as shown in FIG. 5c. Also shown is a circular aperture formed weakened hinge line (28) location, and the craft's flute channel's elongate direction (36), and a manufacturer's area of choice in continuing a floor's weakened hinge line bend and designated by a series of dotted line X shapes (42). FIG. 5c provides a side view of the unassembled foldable boat (10) in a folded position, where the weakened hinge bend lines (42) allow the foldable boat to fold inward on itself for easier transport and storage. As shown in FIGS. 5c and 8d, the water craft may be folded to approximately ⅓ its total length.

In another alternative embodiment, as shown in FIG. 8, a through 8, e, foldable boat (10) further includes second plurality of (33) and third plurality of apertures (53) of stabilizing ballast (80). As shown in FIG. 8a second plurality of apertures (33) are located in hull area (16) of bow end (52) of foldable boat (10), and are formed in a line perpendicular to and abutting sidewall bend lines (26). Second plurality of apertures (33) provide at least a second opening in flute channels (44) of sheet of corrugated plastic (11). Third plurality of apertures (53) are located in hull area (16) of aft end (54) of foldable boat (10), and are formed in a line perpendicular to and abutting sidewall bend lines (26). Third plurality of apertures (53) provide a least a third opening in flute channels (44) of sheet of corrugated plastic (11). In the present embodiment, third plurality of apertures (53) cooperate with first plurality of apertures (30) and second plurality of apertures (33) to allow water to enter or exit the plurality of flute channels (44) running lengthwise through the foldable boat (10). As shown in FIG. 8a the direction (36) of flute channels (44) is parallel to the length of the foldable boat (10). FIGS. 8a, and 8b also show that the first plurality of bend apertures (30) are extended to the sidewalls (17) by a plurality of weakened bend lines (42), the weakened bend lines allow a user to compactly fold the unassembled boat in the lengthwise direction. Second plurality of apertures (33) and third plurality of apertures (53) are also extended to the sidewalls (17) by a plurality of weakened bend lines (42) that allow for an even further compact folding of the unassembled foldable boat (10). Weakened bend lines (42) are formed by a manufacturer by weakening or bending, which results in lines formed on the surface of the sheet of corrugated plastic (11). As shown in FIG. 8c, weakened bend line (42) allow sidewalls (17) to be folded in on floor area (13) of foldable boat. The foldable boat (10) can be more compactly folded, as shown in FIG. 8d, for easier storing and transport of the light-weight water craft.

FIG. 6a shows a partial side view of a water foldable boat (10) with floor area (13) and hull area (38) with slit formed channel openings (46) under the weight of a passenger's footstep, and with the weight being represented by a shoe (64). Note how the floor angles downward just slightly beneath the slit formed stabilizing ballast (80), and how the slit opening has a slightly larger gap when underneath the weight of the shoe. As a passenger walks from one elongate end of the floor to the other end; and when several slits are made within the floor as shown in FIG. 8a; the floor's slit opening widens just slightly to permit more space for water to flow through. An air pocket (68) is then purged even more quickly as water flows through to push any air upwardly towards the water line level. The slit cut shown may be slightly exaggerated to display the cut opening, as any water underneath the floor tends to level out downward pressures of a walking person, and is also pending the thickness of corrugated plastic substrate (11) used in the floor. As shown in FIG. 6a stabilizing ballast (80) is created by a slit formed opening (46) in the flute channel (44). Slit (46) is formed using a slit forming tool (56) to penetrate hull area (38) which creates at least one opening or stabilizing ballast (80) in flute channel (44), thereby reducing the total enclosed length of flute channel (44). As shown, an air pocket (68), is present in at least one flute channel (44). Stabilizing ballast (80) reduces the closed length of flute channel (44) thereby allowing air pocket (68) to exit flute channel (44).

FIG. 6b is a side and partial view of a foldable boat (10) showing stabilizing ballast (80) created by a slot formed opening (48) in the flute channel (44). Slot (48) is formed using a slot forming tool (58) to penetrate hull area (38) which creates at least one opening or stabilizing ballast (80) in flute channel (44), thereby reducing the total enclosed length of flute channel (44).

FIG. 6c is a side and partial view of a foldable boat (10) showing stabilizing ballast (80) created by an inverted alphabetical letter V-cut shape notch formed opening (50) in the flute channel (44). V-cut shape notch (50) is formed using a V-shape notch tool (60) to penetrate hull are (38) which creates at least one opening or stabilizing ballast (80) in flute channel (44), thereby reducing the total enclosed length of flute channel (44).

FIG. 6d is a side and partial view of a foldable boat (10) showing stabilizing ballast (80) created by a concave semi-spherical shape notch formed opening (51) in the flute channel (44). Concave semi-spherical shape notch (51) is formed using a semi-spherical notch tool (62) to penetrate hull are (38) which creates at least one opening or stabilizing ballast (80) in flute channel (44), thereby reducing the total enclosed length of flute channel (44).

FIG. 7a is a plan bottom view of an alternative embodiment of the foldable boat (10), in a completely unfolded and planar position. Unassembled foldable boat (10) includes a single sheet of corrugated plastic (10) that further includes a first plastic substrate (12), having a widthwise dimension and lengthwise dimension and a second Plastic substrate (15), having a widthwise dimension and a lengthwise dimension, overlying first plastic substrate (12). First plastic substrate (12) forms a floor area (13) and interior sidewalls (14) of the foldable boat (10). Second plastic substrate (15) forms a hull area (16) and exterior sidewalls (17) of the foldable boat (10). First Plastic substrate (12) and second Plastic substrate (15) are joined together by a plurality of elongated parallel ribs (45) extending parallel along the entire lengthwise direction of the first and second substrates (12, 15). Single sheet of corrugated plastic (11), here shown as a double walled sheet of corrugated plastic allows for the floor area (13) and hull area (16) of the foldable boat (10) to be formed from the same sheet of material. Plurality of elongate parallel ribs (45) form a plurality of flute channels (44) that run lengthwise through and join first plastic substrate (12) and second plastic substrate (15). Plurality of bend lines (26), (21), and (31) formed on single sheet of corrugated plastic (11) define the perimeter of hull area (16) and floor area (13). Plurality of bend lines include a plurality of sidewall bend lines (26), an aft opening line (21) and a bow opening line (21). Plurality of sidewall bend lines (26) are formed along a portion of the length (labeled "L") of the single sheet of corrugated plastic (11). Sidewall bend lines (26) allow a lengthwise portion of corrugated plastic sheet (11) to hingeably move to form a plurality of sidewalls (14), (17) of foldable boat (10). Aft opening line (31) is formed from a plurality of openings or apertures in the hull area (16) at an aft end (54). Aft opening line (31) is disposed between the plurality of sidewall bend lines (26) and allows a first end portion of the sheet of corrugated plastic (11) to hingeably move to form an aft end sidewall of the foldable boat (10). The plurality of openings in the aft opening line (31) allow water to enter and exit the plurality flute channels (44) at aft end (54) of foldable boat (10). Bow opening line (21) is formed from a plurality of openings or apertures in the hull area (16) at the bow end (52). Bow opening line (21) is disposed between the plurality of sidewall bend lines (26) and allows a second end portion of the corrugated plastic (11) to hingeably move to form a bow end sidewall of the foldable boat (10). The plurality of openings in the bow opening line (21) allow water to enter and exit plurality of flute channels (44) at bow end (52) of foldable boat (10). Plurality of hinges (40), shown as an "X" shape on each of the corners of sheet of corrugated plastic (11). Plurality of folding hinges (40) cooperate with plurality of sidewall bend lines (26), aft opening line (31), and bow opening line (21) to enable sheet of corrugated plastic (11) to fold inward to form an open cabin (41) and floor area (13) of foldable boat (10). A water craft manufacturer can vary the location of folding hinges (40) in corners to form a slightly different sized open cabin (41) of foldable boat (10). Foldable boat 10 additionally includes a stabilizing ballast (80). Stabilizing ballast (80) further includes a plurality of apertures (30) centrally located in the hull area (16). Plurality of apertures (30) are formed perpendicular to the sidewall bend lines (26) and create at least one additional opening in the plurality of flute channels (44). Plurality of apertures (30) of stabilizing ballast (80) allow water to enter or exit the plurality of flute channels (30) running lengthwise through the foldable boat (10). As shown, plurality of apertures (30) intermittently extend the along the width of the hull area (16) and are perpendicular to the floor area (13) and craft's elongate direction (36).

FIG. 7b is a side view of FIG. 7a, showing the weakened hinge bend line (42) a crimp, or a hinge forming slit, designated by a series of dotted line alphabetical letter X shapes (42). Also shown are slit formed opened flute channel locations (46). Weakened hinge bend line (42) extends from first plurality of apertures (30) to end of corrugated plastic substrate (11) to allow for easy folding of corrugated plastic substrate (11).

FIG. 4a is a perspective bottom view of the foldable boat (10 of FIG. 7a. As shown in FIG. 4a, bow opening line (21) of corrugated plastic substrate (11) shows the open flute channels (44) at bow end (52) of foldable boat (10). slit formed (Dan this wasn't striked through) FIG. 4b is a side and upright view of FIG. 4a, and showing a single corrugated plastic sheet (11) with a water craft manufacturer's slit formed bow opening line (21), which is aligned perpendicular to the elongate direction (36) of the flute channels (44), and also includes inwardly located circular apertures (22), and inwardly located fish scale like semi-circular tabular flap openings (24). FIG. 4c is an end and slightly perspective view of an aperture formed in the flute channel (44) as a result of the bow opening line (31), showing the exposed ribs of flute channel (44), FIG. 9a is a plan bottom view of an alternative embodiment of the unassembled foldable boat (10) of the present invention. Unassembled foldable boat (10) includes a single sheet of corrugated plastic (11) that further includes first plastic substrate (12) having a widthwise dimension and a lengthwise dimension, and second plastic substrate (15) having a widthwise dimension and a lengthwise dimension, overlying the first plastic substrate (12). First plastic substrate (12) forms a floor area (13) and interior sidewalls (14) of foldable boat (10). Second plastic substrate (15) forms a hull area (16) and exterior sidewalls (17) of foldable boat (10). First plastic substrate (12) and second plastic substrate (15) are joined together by a plurality of parallel ribs (45). In the present embodiment, plurality of parallel ribs (45) extend perpendicular along the lengthwise dimension of the first and second plastic substrates (12, 15) to form a plurality of flute channels (44) widthwise through the conjoined first plastic substrate (12) and second plastic substrate (15). Unassembled foldable boat (10) further includes a plurality of bend lines (23), (26), and (27) formed by crimping the sheet of corrugated plastic (11). Plurality of bend lines further include a plurality of sidewall bend lines (26), a aft bend line (23) and a bow bend line (27). Plurality of sidewall bend lines (26) are formed along a portion of the length (labeled "L") of the sheet of corrugated plastic (11). Sidewall bend lines (26) allow a lengthwise portion of the sheet of corrugated plastic (11) to hinny move to form a plurality of sidewalls (17) of the foldable boat (10). Aft bend line (23) is disposed between the plurality of sidewall bend lines (26) and formed along a portion of the width (labeled "W") of the sheet of corrugated plastic (11) at an aft end (54). Aft bend line (23) allows a first end portion (20) of the corrugated plastic to ably move to form an aft end sidewall of the foldable boat (11). Bow bend line (27) is disposed between plurality of sidewall bend lines (26) and opposite aft bend line (23). Bow bend line (27) is formed along a portion of the width of the sheet of corrugated plastic (11) at a bow end (52). Bow bend line (27) allows a second end portion (19) of the corrugated plastic (11) to hingeably move to form a bow end sidewall of the foldable boat (11). Foldable boat (10) further includes a plurality of folding hinges (40). Plurality of folding hinges (40) are located at each corner of the sheet of corrugated plastic (11). Plurality of folding hinges (40) cooperate with the plurality of sidewall bend lines (26), aft bend line (23), and bow bend line (27) to enable the first plastic substrate (12) and second substrate (15) to fold inward to form an open cabin (41). Foldable boat (10) also includes a stabilizing ballast (80). Stabilizing ballast (80) further includes a first lengthwise plurality of apertures (71) formed in a line of the hull area (16) and centrally located lengthwise in the hull area (71). First plurality of lengthwise apertures (71) are formed parallel to the sidewall bend lines (26) and perpendicular to the aft bend line (23) and bow bend line (27) and create at least one opening (28) in the plurality of flute channels (44). First lengthwise plurality of apertures (71) allow water to enter or exit the plurality of flute channels (44) running widthwise through the foldable boat. Stabilizing ballast (80) further includes a second lengthwise plurality of apertures (72) and a third lengthwise plurality of apertures (73). Second lengthwise plurality of apertures (72) are formed in a line of the hull area (16) and located proximate to one of the sidewall bend lines (26), and are formed parallel to the sidewall bend lines (26) and perpendicular to the aft bend line (23) and bow bend line (27) and create a second opening in the plurality of flute channels (44). Third lengthwise plurality of apertures (73) are formed in a line of the hull area (16) located proximate a second sidewall bend line (26) away from second lengthwise plurality of apertures (72). Third lengthwise plurality of apertures (73) are formed parallel to the sidewall bend lines (26) and perpendicular to the aft bend line (23) and bow bend line (27) and create a third opening in the plurality of flute channels (44). Third lengthwise plurality of apertures (73) cooperate with the first lengthwise plurality of apertures (71) and second lengthwise plurality (72) of apertures to allow water to enter or exit the plurality of flute channels (44) running in the widthwise direction (36) through the foldable boat (10). In this embodiment, direction (36) of the flute channels (44) is parallel to the widthwise dimension of the foldable boat (10). Stabilizing ballast of the current embodiment also includes at least one plurality of widthwise apertures (74) in a line running perpendicular to and abutting the sidewall bend lines (26) and parallel to the aft bend line (23) and bow bend line (27). The at least one plurality of widthwise apertures (74) create at plurality of openings in a single flute channel (44). The at least one plurality of widthwise apertures (74) cooperate with the first lengthwise plurality of apertures (71), the second lengthwise plurality of apertures (72), and the third lengthwise plurality of apertures (73) to allow water to enter or exit the plurality of flute channels (44) running widthwise through the foldable boat 10. In the present embodiment, there are three sets of plurality of widthwise apertures (74). As shown in FIG. 9 a, the three sets of plurality of widthwise apertures (74) are continued to the end of the corrugated plastic (11) by a bend or crimp in the corrugated plastic (11) and designated by a series of dotted line alphabetical letter X shapes, these continuations are weakened hinge bend lines (42). Weakened hinge bend lines (42) allow for compact folding of the foldable boat (10).

FIG. 9b is a side view of FIG. 9a showing how the weakened hinge bend lines (42) allow the aft end (52) and bow end (54) to be folded inwardly for transport or storage.

FIG. 9c is a side view of FIG. 9 a showing how the weakened hinge bend lines (42) allow the aft end (52) and bow end (54), and central portion of the foldable boat (10) to be compactly folded inwardly for transport or storage.

FIG. 10a is a perspective view of a triple wall corrugated substrate being cut with a wide slot forming tool (58), and cutting through at least one of the first or second substrates of the corrugated plastic sheet (11). The cut does not penetrate the intermediate plastic substrate (18). Any of the above described embodiments can be made from a triple wall corrugated plastic substrate.

As shown in FIG. 10b the triple wall corrugated plastic substrate (11) has an additional closed flute channel that is not exposed to water. After the substrate is bent approximately 90 degrees toward the floor's (39) surface area, a closed flute channel still remains near the crimp area (37). In FIG. 10c, draft line (70) is shows where water enters the open flute channel (48). As shown here, direction (36) of open flute channels is both parallel and perpendicular to the length of the corrugated plastic sheet (11).

FIG. 10d is a side and upright view of the substrate of FIG. 10c, but shown as when the combination floor and hull are out of the water and folded for further compacting the substrate. Shown are two locations of the crimped areas (37) formed by the intermediate substrate (18) and the first substrate (12).

A sheet single of corrugated plastic (11) comprises two or more planar surfaces conjoined by paralleling ribs (45) which extend the substrate's entire dimension, and normally paralleling the corrugated plastic substrate's longest measurement. In an alternative embodiment, as shown in FIGS. 9a through 9c the parallel ribs (45) parallel the width dimension of the corrugated plastic substrate (11).

Corrugated plastic substrates (11) are commercially sold in 4 foot widths, and with the elongate flute channels (44) normally extending and paralleling the substrate's elongate length. The most standard sizes of corrugated plastic are 3/16 inch thick with a 4 mil wall thickness; and 1/4 inch thick with a 6 mil wall thickness; and 3/8 to 1/2 inch thick with a 10 mil wall thickness. These stated sizes have interior flute channel dimensions ranging from 0.20 by 0.22 inches and up to 0.30 by 0.40 inches. Corrugated plastic is also available in almost any length, and is available with flute channels (44) paralleling its width, and also in a triple wall format.

At least one manufacturer has done tests at 72 degrees Fahrenheit, and has found corrugated plastic to be bendable thousands of times before fracturing; and have referred to it as a living hinge. It is extremely light in weight, yet remains fairly rigid until exposed to temperatures above 90 to 95 degrees Fahrenheit; where it then is somewhat more flexible, and pending its wall and rib thickness.

When a corrugated plastic water craft's floor is placed upon a water's surface, the water has the effect of leveling out any flexing of the substrate, as when compared to a human user standing on the substrate when upon a somewhat uneven ground terrain. When a corrugated plastic water craft's floor's flute channels (44) include openings or inlets for the water to enter, the corrugated plastic in a sense, more becomes a part of the water and its flow. The water beneath the floor's wall more evenly supports a user's weight load and any variations of weight stresses as a passenger moves about. Some increased drag does occur with a water filled flute channel (44), but the floor and hull's water filled flute channel's stabilizing merits far outweigh the small reduction in a corrugated water craft's speed.

A manufacturer can choose a variety of methods to form the sidewall of foldable boat (10). FIG. 1a sidewall bend lines (26) are crimp formed to bend the corrugated plastic and which also define the perimeter of the combination floor area (13) and hull area (16).

Within each corner of the substrate, folding bend lines (40) are located exterior to the hull's marked perimeter, a manufacturing user may use any configuration of forming an open cabin (41) to arrive at the desired dimension.

This disclosure does not address all areas exterior to the floor's perimeter; and as a water craft manufacturer will determine how the substrate is formed, bent, or configured to the open cabin five sided water craft's structural formation. Any areas which are addressed will pertain to the water filled flute channels within the combination floor and hull, or a manufacturer's possible configurations of a water craft's formation which will affect the floor's water filled flute channels.

When a manufacturer chooses to use a sidewall bend line (26); and shown using crimps (29) in FIG. 1b, and as shown in a close up view within FIG. 3b. Crimped areas (29) will easily permit air and fluid to flow through, and until any fluid within the flute channels (44), until the air of fluid reaches the water craft's waterline level, or draft line (70). Water may flow through the crimped areas (29) a little slower than the air, but will still flow through. The draft on a 10 foot long water craft with a 10 foot long by 27 inch wide floor is about 1 inch to 2 inches with a 170 pound passenger; and so the distance water needs to travel past the crimped area (29), and then vertically upwards within an assembled water craft's bow or aft's end wall is nominal.

To prepare corrugated plastic (11) for foldable boat (10), as shown in FIG. 1a, user may use a circular milling tool bit or a hand drill bit to form the circular apertures (22). The apertures (22) in FIG. 1a do not necessarily have to be in the exact configuration as shown, yet this arrangement prevents a forming of any weakened hinge lines which are parallel or perpendicular to the substrate's length. As the grouping of circular apertures are in a general V-shape, and when within the box like configuration of an assembled corrugated plastic open cabin water craft as shown in FIG. 1b, the hull's V-shaped apertured areas can not form into unintentional weakened hinge lines. The apertures are spaced apart and aligned from each corner in a direction which is approximately towards the hull's center. Many other arrangements of apertures are possible to provide a plurality of a liquid's entry and exit locations. In water crafts such as a fire truck's emergency water craft with a long length of 10 feet to 14 feet or more, several groups of circular shape apertures (22) which form a larger V-shape or other shapes which do not form a straight plurality of apertures, will help to retain the floor and hull's planar rigidity while still stabilizing the floor and hull with the water filled channels within the extremely light weight craft.

The method of forming slits as shown in FIG. 1a, to create a first plurality of openings (30) of stabilizing ballast (80) which create flute channel (44) openings, is via a thin cutting knife tool (56) as shown in FIG. 6a; and is used to form a plurality of apertures (30). As shown in FIG. 1a, the plurality of apertures (30) are intermittent in their continuity to retain the planar stability of the substrate until a user chooses to extend any bend locations further to include a bending of the water craft's side walls for a compact folding. As shown in FIG. 6*a* a passenger's weight is represented by a shoe (64) upon the floor (39) which slightly opens the hull's (38) surface just enough for the slit formed in the flute channel (44) or flute channel opening (46) to more quickly facilitate the water's entry for a faster purging of any randomly moving air pocket (68).

At least one alternative embodiment of the single sheet of corrugated plastic (11) is shown in FIG. 2*b*, which is a three walled substrate including a first plastic substrate (12), an intermediate plastic substrate (18) and a second plastic substrate (15) with conjoining and paralleling ribs (45) which form the paralleling flute channels (44). A double wall substrate is shown in FIG. 2*a*.

Alternative embodiments of forming openings within the floor may include tabulated openings (24) in one exterior wall of a double wall floor substrate, and being in a fish scale like, or semi-circular shape; and are shown in FIG. 3*a* (24). These tabulated openings are best used when a manufacturer has a slanted bow within the craft, and where the manufacturer may align the tabulated openings accordingly to the water craft's direction of travel to achieve less drag.

When a manufacturer chooses to use a continuous slit formed bow opening line (21), this also applies to the aft opening (31), not shown, as shown in FIG. 4*a*; the slit will open all flute channel openings by cutting through one wall's planar surface, and directionally perpendicular to the flute channels' elongate direction, and at least partially cutting within the conjoining ribs (45).

When the substrate is bent along the slit cut bow opening line (21), as shown in FIG. 4*a*, the ribs (45) will self score until reaching the opposite planar membrane wall; and where the remaining planar wall serves as a hinge to bend thousands of times and remain leak proof.

When a manufacturer does not choose to use a flute channel opening slit as described in FIG. 4*a*; and so chooses to use a crimped bend, or sidewall bend line 26, at the craft's bow end (52) and or stern end (54); as shown in FIG. 1*a* or FIG. 3*b*, a floor may alternatively include at least one or more groups of circular shape apertures (22) which are aligned in a direction which is perpendicular to the flute channels' (44) directional path (36) as shown in FIGS. 5*a,b,c*; and may also include any number of additional flute channel openings (46) which are separate from the aligned group's direction, but not shown in FIGS. 5*a,b,c*.

This alignment of circular shaped apertures in FIG. 5*a* may form a circular shape aperture formed potential weakened hinge line (28); and where the apertures will still weaken the substrate if cut directly over any ribs (45) or between the ribs, as the material will still be weakened enough to form a bend within the substrate.

See FIG. 4*c* for an end perspective view of an aperture formed weakened hinge line (28), with the apertures (51) formed between any ribs (45), and aligning perpendicular to the flute channel's elongate direction (36). The polymer plastic will stretch in areas surrounding the apertures (51) for a floor's compact folding when a manufacturer chooses to extend any weakened hinge line located within the floor; and further and completely up the water craft's sidewalls. These areas of choice are designated in FIG. 5*a* with a series of dotted line alphabetical letter X shapes (42) which continue the floor's weakened hinge line direction; and here on may be defined as area X (42).

Only one stabilizing ballast (80) formed by a plurality of apertures (30) is shown in the drawing of FIG. 5*a*, but several may be used; in addition to additional random and un-aligned apertures.

A single sheet of corrugated plastic (11) thickness, and the length of a water craft, and the intended weight limit load; will all affect a manufacturer's choice of which of the tool shapes disclosed will be used; and for better determining a water's rate of flow into and its exiting from any flute channel openings.

When a manufacturer does choose to use any of the flute channel opening tools within FIGS. 6*a* through 6*d*; and when located at a water craft's bow and or stern in the forming of weakened hinge line bends as in FIG. 7*a* (30); a slit formed flute channel opening or first plurality of apertures (30) may be formed in the floor's center area also.

The centeredly located, first plurality of apertures (30) of stabilizing ballast (80) as shown in FIG. 6*a* and FIG. 7*a*; reduces the length of most of the water filled channels by half; and so provides a quicker purging of any randomly moving air pockets; and so facilitates a more uniform and more consistent stability of the floor and water craft. Remembering that seconds count between a consistently good lateral stability and a lessened lateral stability due to any randomly flowing air pockets, as the water within the flute channels needs to travel only half the distance before purging any air pockets. These few seconds saved can determine a passenger's retained sense of balance versus the previously stated beginning point of confusion of balance; which can quickly lead to any further over correcting. Where the water craft is being used may also make a difference; as the calm waters of a small lake may not require the few seconds saved as much as when compared to the faster moving waters of a stream or river when every second counts. Timing is everything when a standing or walking active passenger or pet is maintaining their sense of balance within the extremely light weight water craft.

One major U.S. manufacturer of corrugated plastic has a maximum of 104 inches wide in their extrusion processing equipment, and so may limit this alternative embodiment to a maximum length of 104 inches. This embodiment does have merits wherein its width may be greater than any previously described floor or water craft, and without any special ordering costs or wasted material costs to attain a wider width of the floor and craft.

One of the best attributes of any embodiment with the aligned circular apertures (22) is the forming of potential weakened hinge lines (28) within the drawing of FIG. 9*a*. The intersecting configuration(s) of aligned apertures almost retain the floor and hull's original strength, while still providing numerous water inlet openings throughout the hull's exterior surface; and while the manufacturer retains several options of continuing the floors potential weakened hinge lines in different directions via their choices within the multiple areas X (42) within the side walls.

The size of, or spacing between, or quantity of any apertures do not have to be as depicted in the drawings; as variables may change concerning the thickness of substrate, and the intended passenger weight limit, and the overall size of the floor and its craft, and whether the manufacturer or user will make the initial bends.

A triple wall corrugated plastic material as shown in FIG. 2*b* solves the problem of folding an extra large 48 inch by 16 foot water craft with a 2 foot by 14 foot combination floor and hull.

FIG. 10*a* shows a bottom perspective view of a slot forming cutting tool (58) which is wider in diameter than would normally be used for a double wall substrate. The tool is cutting through a first substrate plastic substrate (12) and at least partially through any conjoining ribs (45) to expose newly opened slot formed flute channel openings (48) to form a stabilizing ballast (80) within the triple wall substrate.

When the substrate is bent as in the side view of FIG. 10b, any remaining portions of the ribs will self score or tear until reaching the intermediate plastic substrate (18) and where the two remaining plastic substrates (15), (18) planar will form the potential crimped area (37), and in a direction which is perpendicular to the flute channels' elongate direction.

Also shown in FIG. 10b, is a draft line (70), and the slot formed newly opened flute channel openings (48), and a zoomed in view of the crimped area (37). Within FIG. 10c and FIG. 10d are two closely aligned arrangements of newly opened flute channel openings (48) which permit a folding which is directed away from the floor's (39) surface.

When using a combined arrangement of folded portions which fold toward the floor's surface, and with the arrangement depicted within FIG. 10d being located intermediate and perpendicular to the combination floor and hull's elongate length, a combination floor and hull may be even more compactly folded without overly stressing any hinge line areas.

A floor and its surrounding water craft are not limited to the existing industry standard of a co-polymer polypropylene plastic. A durable polyethylene, or a more flexible and highly durable polyurethane or other LDP type low density plastic polymers may also be used. This disclosure claims these types, yet is not limited to those specifically from the hundreds of chemical combinations possible.

In summation; this disclosure provides a more laterally stable foldable boat (10) constructed from a single sheet of corrugated plastic (11), because the construction of the foldable boat (10) is from a single sheet of corrugate plastic (11) the hull area (16) and floor area (13) of the boat are formed from the same sheet of material. The foldable boat (10) disclosed provides a more laterally stable corrugated plastic water craft, because the fluid weight of the water in the flute channels (44) is counter-balanced and stabilized throughout the flute channels (44) by the stabilizing ballast (80) which includes at least a first plurality of apertures (30). Stabilizing ballast (80) provides decreased flute channel (44) lengths via a plurality of flute channel aperture openings for a quicker purging of any randomly moving de-stabilizing air pockets. An additional advantage of the present invention is the additional weakened hinge bend lines (42) that allow for a more compactable folding of the corrugated plastic floor.

Advantages of the present invention include: a plurality of slit or slot or special shape channel openings located inwardly between an assembled water craft's bow and aft ends to reduce a floor's water filled flute channel's elongate length for a quicker purging of any de-stabilizing randomly moving air pockets;

a tabular like semi-circular shape flap for alignment according to a water craft floor's direction of travel; and for either a decreased drag or an increased fluid's flow;

the few seconds saved to prevent any confusion of balance via a reduced length of any water filled enclosed channels;

channel openings in a form of spaced apart apertures aligned perpendicular to a floor's elongate length; and which retain a floor's planar structural integrity until a time of bending the substrate; and wherein material surrounding the apertures stretches to form a weakened hinge line.

The previous descriptions of common sizes or thicknesses of available corrugated plastic are not intended to exclude any thicker or thinner materials of either the plastic substrate's planar walls or conjoining ribs. While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and method, and/or illustrative examples shown and described. Accordingly, departures may be made from such details without departing from the spirit or scope of the applicant's general invention concept.

What we claim is:

1. A plastic water craft, comprising: a plastic substrate which includes two approximately planar walls being connected by elongate parallel ribs to define a plurality of elongate channels with the two approximately planar walls each having a bow end and an aft end, a floor and hull bottom for the watercraft wherein an exterior surface only of said hull bottom includes a plurality of openings located between said bow end and said aft end, wherein said openings facilitate entry and exit locations for a fluid, and wherein said fluid is ballast for the water craft.

2. A plastic water craft, comprising: a plastic substrate which includes two approximately planar walls being connected by elongate parallel ribs to define a plurality of elongate channels with the two approximately planar walls each having a bow end and an aft end, a floor and hull bottom for the watercraft wherein an exterior surface only of said hull bottom includes a plurality of openings located between said bow end and said aft end, wherein said openings are longitudinally aligned with respect to said elongate channels, and wherein said openings facilitate entry and exit locations of fluid, and wherein said fluid is ballast for the water craft, and wherein a weakened hinge of the watercraft enables a compacted folding of said floor and hull bottom.

3. A plastic water craft as in claim 1, wherein said openings have a cut through apertures within at least one membrane wall of said substrate.

4. A plastic water craft as in claim 1, wherein said openings have a cut through apertures within at least one membrane wall of said substrate and at least partially cut through said ribs.

5. A plastic water craft as in claim 1, wherein said openings have a cut through apertures within at least one membrane wall of said substrate and between said ribs.

6. A plastic water craft as in claim 1, wherein said openings have a tabular flap.

7. A plastic water craft as in claim 4, wherein said openings are formed by a slit.

8. A plastic water craft as in claim 1, wherein said openings are formed by a slot.

9. A plastic water craft as in claim 1, wherein said openings are formed by a notch.

10. A plastic water craft as in claim 2, wherein said openings are formed intermittent in their continuity to retain a planar structural stability of said floor and hull prior to said folding.

11. A plastic water craft as in claim 1, wherein said openings are aligned perpendicular to an elongate direction of said floor.

12. A plastic water craft as in claim 1, wherein said openings are aligned parallel to an elongate direction of said floor.

13. A plastic water craft as in claim 1, wherein an aligned plurality of said openings forms a weakened hinge bend line.

14. A plastic water craft as in claim 1, a single slit is formed in said plurality of said openings forms a weakened hinge bend line.

15. A plastic water craft as in claim 1, a single slot is formed in said plurality of said openings forms a weakened hinge bend line.

16. A plastic water craft as in claim 1, wherein a single notch is formed in said plurality of openings forms a weakened hinge bend line.

17. A plastic water craft as in claim 1, wherein said substrate is formed from a polyethylene plastic material.

18. A plastic water craft as in claim 1, wherein said substrate is formed from a polypropylene plastic material.

19. A plastic water craft as in claim 1, wherein said substrate is formed from a polyurethane plastic material.

20. A plastic water craft as in claim 1, wherein a variance of thickness of material surrounds said openings.

* * * * *